[12] United States Patent  
McCormack et al.

(10) Patent No.: US 12,210,612 B2  
(45) Date of Patent: Jan. 28, 2025

(54) TECHNIQUES FOR MANAGING SOFTWARE APPLICATIONS

(71) Applicant: Apple Inc., Cupertino, CA (US)

(72) Inventors: Geoffrey McCormack, San Jose, CA (US); Damien P. Sorresso, San Francisco, CA (US); Eric B. Tamura, Sunnyvale, CA (US); Robert J. Kendall-Kuppe, San Jose, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 17/664,206

(22) Filed: May 19, 2022

(65) Prior Publication Data

US 2023/0099057 A1 Mar. 30, 2023

Related U.S. Application Data

(60) Provisional application No. 63/261,585, filed on Sep. 24, 2021.

(51) Int. Cl.  
G06F 21/51 (2013.01)  
H04L 9/32 (2006.01)

(52) U.S. Cl.  
CPC ............ G06F 21/51 (2013.01); H04L 9/3239 (2013.01); G06F 2221/033 (2013.01)

(58) Field of Classification Search  
None  
See application file for complete search history.

(56) References Cited

U.S. PATENT DOCUMENTS

| 8,572,215 | B2 | 10/2013 | Ryder | |
| 2019/0286613 | A1* | 9/2019 | Bramante | G06F 7/00 |
| 2019/0377889 | A1* | 12/2019 | Mertens | G06F 21/60 |
| 2021/0157915 | A1* | 5/2021 | Pizano | G06F 21/563 |
| 2021/0359981 | A1* | 11/2021 | D'Agostino | H04L 63/0807 |
| 2022/0188719 | A1* | 6/2022 | Ramaswamy | G06F 21/552 |
| 2023/0370274 | A1* | 11/2023 | Chen | H04L 9/0825 |

* cited by examiner

Primary Examiner — Joseph P Hirl  
Assistant Examiner — Hassan Saadoun  
(74) Attorney, Agent, or Firm — DICKINSON WRIGHT RLLP

(57) ABSTRACT

Enclosed herein are techniques for securely executing an application. A method can be implemented by an operating system of a computing device, where the computing device includes a file system volume that includes a first data structure, and the method includes the steps of (1) receiving a request to launch the application, where the request references an application archive file that includes a second data structure that: (i) defines an organization of a plurality of files associated with the application, and (ii) includes cryptographic information for verifying the plurality of files and the second data structure; (2) in response to receiving the request: determining whether the second data structure, the plurality of files, or both, are valid using the cryptographic information; and (3) in response to determining that the second data structure, the plurality of files, or both, are valid: associating the second data structure with the first data structure.

20 Claims, 17 Drawing Sheets

Step 0: Initial states of components of an application archive file

Step 1: Read request for File 3 received

Step 0: Initial state of computing device operation (no applications executing)

Step 1: Receive request to launch Application_1

Step 2: Mount an application FS volume for managing application execution

Step 3: Make the application FS volume accessible to the OS

Step 5: Files and security info of Application_1 are now accessible

TECHNIQUES FOR MANAGING SOFTWARE APPLICATIONS

CROSS-REFERENCE TO RELATED APPLICATIONS

The present application claims the benefit of U.S. Provisional Application No. 63/261,585, entitled "TECHNIQUES FOR MANAGING SOFTWARE APPLICATIONS," filed Sep. 24, 2021, the content of which is incorporated herein by reference in its entirety for all purposes.

FIELD

The described embodiments relate generally to software applications and computing devices. More particularly, the described embodiments relate to techniques for securely generating, distributing, executing, updating, and uninstalling software applications on computing devices.

BACKGROUND

A software application is typically composed of a variety of resources that enable the software application to be executed by way of an operating system (OS). Such resources can include, for example, machine code that implements the logic of the software application, auxiliary code that complements the machine code (e.g., JavaScript), various files that make up a user interface (UI) of the software application (e.g., images, UI code segments), configuration files, metadata, and the like. One approach for organizing these resources involves encapsulating them into a single entity—referred to herein as an "application archive file"—that constitutes a special directory considered by the OS to be a single atomic unit. The application archive file provides various advantages, including the ability to present the software application as a single icon that contributes to a clean and organized file system and enables a user to conveniently uninstall the application through a single action. Additionally—and, notwithstanding the encapsulation characteristics inherent to application archive files—the specialized directories can be traversed, enumerated, and accessed by the OS in a manner that permits the individual resources to be read into memory on an as-needed basis.

The overall importance of software security has increased in correlation to the escalating rate at which malicious entities are attempting to manipulate software applications to their advantage. One popular approach used to improve security involves implementing code signing techniques for authenticating and verifying software applications. To implement this approach, a software distributor can authenticate and sign the machine code of a software application prior to making it available for distribution to end-users. In turn, computing devices that install the software application can independently verify the machine code to ensure that the machine code has not been manipulated. This approach can be achieved, for example, by instantiating a hook in a kernel of the OS that causes each read request for a page of machine code from a storage device (e.g., a solid-state storage device (SSD)) to be verified prior to being stored into memory (e.g., random access memory (RAM)). In particular, to verify a given page of machine code, the OS can generate its own hash of the machine code and compare it against a known value that was provided along with the software application. If the page of machine code is verified, then the OS can place the page into memory and operate under the assumption that the page is trustworthy throughout the execution of the software application.

The foregoing code signing techniques continue to function as an effective protective measure against malicious parties who attempt to manipulate the logic of software applications at a machine code level. Unfortunately, recent events have revealed that software application resources other than the machine code itself—e.g., auxiliary code, UI information, configuration files, metadata, etc.—can be modified to manipulate the overall execution of software applications. One attempt to mitigate this issue involves verifying the resources of the software application whenever possible, e.g., during installation of the application, during an initialization of the application, and so on. However, these instances amount to few and specific choke points at which the verifications can be performed, thereby leaving the resources exposed to manipulation for extended periods of time. Consequently, malicious entities can, with enough time and dedication, identify ways to manipulate the software application's resources to cause it to function to their advantage.

SUMMARY

Representative embodiments set forth herein disclose various techniques for securely generating, distributing, executing, updating, and uninstalling software applications on computing devices.

One embodiment sets forth a method for securely executing an application. According to some embodiments, the method is implemented by an operating system (OS) of a computing device, where the computing device includes a file system volume that includes a first data structure. According to some embodiments, the method includes the steps of (1) receiving a request to launch the application, where the request references an application archive file that includes a second data structure that: (i) defines an organization of a plurality of files associated with the application, and (ii) includes cryptographic information for verifying the plurality of files and the second data structure; (2) in response to receiving the request: determining whether the second data structure, the plurality of files, or both, are valid using the cryptographic information; and (3) in response to determining that the second data structure, the plurality of files, or both, are valid: associating the second data structure with the first data structure.

According to some embodiments, the first data structure: (1) defines an organization of a second plurality of files associated with the filesystem volume including the operating system, and (2) includes second cryptographic information for verifying the second plurality of files and the first data structure. According to some embodiments, enabling the application to securely execute by way of the filesystem volume comprises: (1) receiving, from the application, a second request to access at least one file of the plurality of files; (2) referencing the second data structure to access the at least one file from the plurality of files; and (3) utilizing the cryptographic information to validate the at least one file. According to some embodiments, the cryptographic information comprises a hash tree that includes a plurality of nodes, where utilizing the hash tree to validate the at least one file comprises: (1) identifying, among the plurality of nodes, at least one node that corresponds to the at least one file; (2) generating a hash of the at least one file; and (3) comparing the hash to at least one hash included in the at least one node. According to some embodiments, the method can further include the step of, in response to determining that the hash does not match the at least one hash included in the at least one node: returning an error that causes the application to terminate.

According to some embodiments, the first data structure comprises a first filesystem for the filesystem volume, the second data structure comprises a second filesystem for the application, and associating the second data structure with the first data structure causes the second filesystem to be accessible only by way of the first filesystem.

According to some embodiments, the method can further include the step of, in response to receiving an update for the application to produce an updated application: (1) updating the second data structure based on the update to produce a modified second data structure that: defines an organization of an updated plurality of files associated with the application, and includes second cryptographic information for verifying the updated plurality of files and the modified second data structure; and (2) associating the modified second data structure with the first data structure to enable the updated application to securely execute by way of the filesystem volume. Moreover, the method can further include the step of, prior to updating the second data structure, and, in response to determining that the application is executing: (1) terminating the application; and (2) disassociating the second data structure with the first data structure.

Another embodiment sets forth a method for managing application executions to facilitate comprehensive uninstallations. According to some embodiments, the method is implemented by a computing device, and includes the steps of (1) executing an application, where: the application is associated with (i) a plurality of files of which the application is comprised, and (ii) a data structure that defines an organization of the plurality of files, and the application executes in a secure mode such that application is only permitted to access the plurality of files by way of the data structure; (2) receiving, from the application, a request to interact with at least one resource external to the data structure; and (3) in response to validating the request: associating the at least one resource with the data structure.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
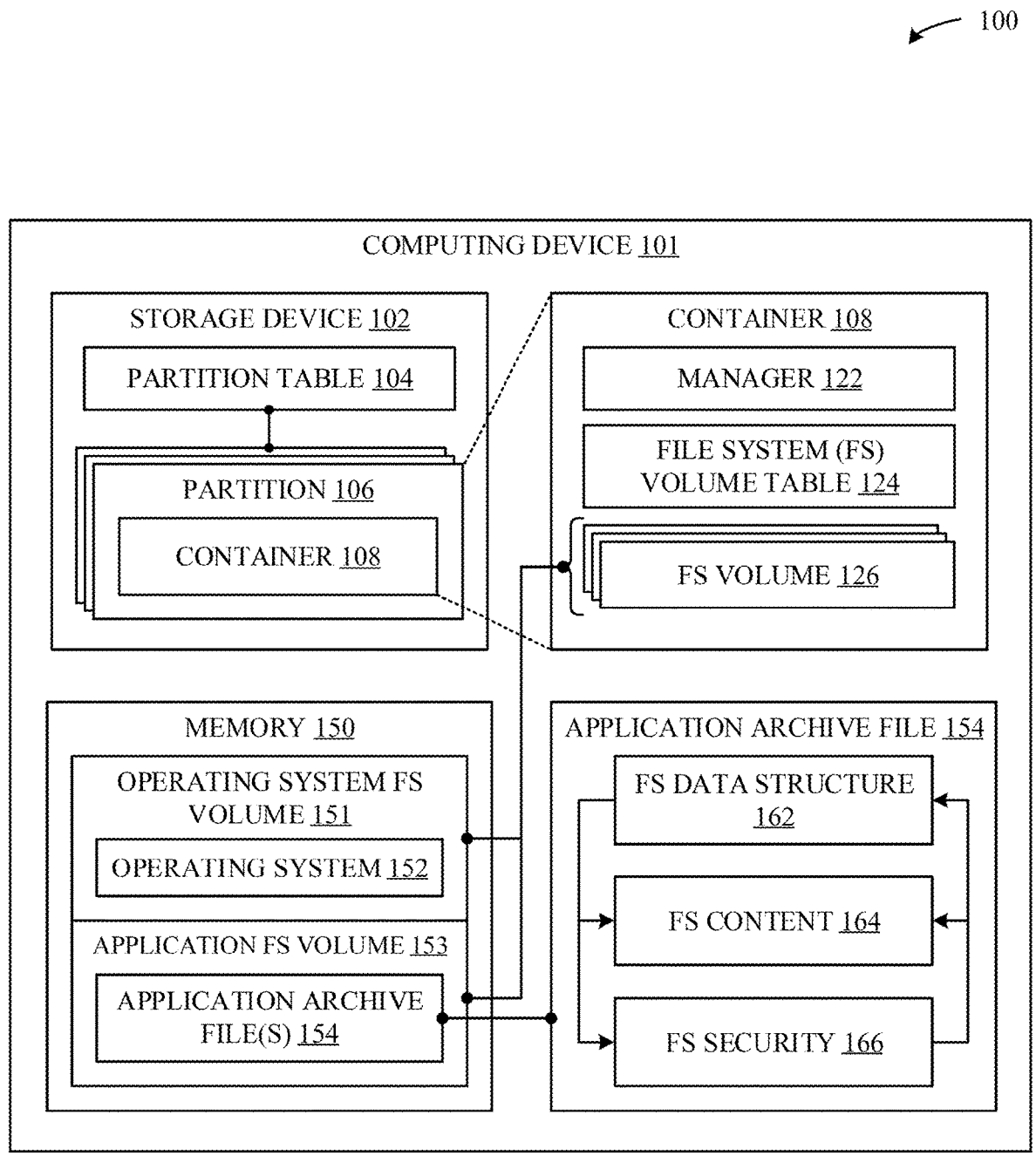
FIG. 1 illustrates a system diagram of a computing device that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

One embodiment sets forth a technique for enabling secure/ongoing execution of applications that are distributed in the form of application archive files. An application archive file for a given software application can include a file system data structure that describes (1) file system content (e.g., various files of which the software application is comprised), and (2) file system security information (e.g., cryptographic information that corresponds to the file system content and/or the file system data structure). The relationships and dependencies between the foregoing entities of the application archive file render the application archive file largely immutable in that each entity cannot be modified without invalidating another. To facilitate a secure execution of a given software application, an operating system (OS) first makes the application archive file for the software application accessible. To achieve this end, the OS incorporates the application archive file into an overarching file system that is mounted to encompass various application archive files for applications that are executing by way of the OS. More specifically, incorporating the application archive file into the overarching file system involves retrieving the file system data structure of the application archive file and associating it with a respective file system data structure of the overarching file system. The foregoing incorporation/association is collectively referred to herein as a "graft." Through this graft, the application archive file (and its contents) becomes accessible by way of overarching file system and eliminates the need to establish individual mount points for application archive files for respective software applications as they are launched and utilized, which otherwise would be time and resource intensive. Moreover, this approach enables the OS to efficiently validate the file system data structure/file system content against the file system security information in relation to the execution of the application, which provides considerable enhancements to the overall level of security that can be provided.

Another embodiment sets forth a technique for updating software applications despite their corresponding application archive files being immutable. In particular, to update a given software application, the file system data structure (of the application archive file of the software application) is removed from the respective file system data structure of the overarching file system if/when the software application is executing when the update is to be performed. Subsequently, the file system data structure, the file system content, and the file system security information of the application archive file are updated in accordance with a software update directed to the software application. In turn, an updated application archive file is generated for the updated file system data structure, the updated file system content, and the updated file system security information. Subsequently, the grafting techniques described herein can be carried out to enable the updated software application to execute in a secure manner using the updated application archive file in accordance with the other security-focused techniques described herein.

Yet another embodiment sets forth a technique for enabling clean uninstallations of software applications on a computing device. This technique involves limiting the boundaries under which a given software application can operate such that the software application—at least by default—is only permitted to access its own file system content included in the corresponding application archive file of the software application. However, during execution, the software application can be permitted to issue requests to the OS to access locations outside of its corresponding application archive file. If the OS deems that a given request to access a given outside location is permissible, then the OS associates the outside location with the file system data structure of the application archive file using the grafting techniques described herein. In turn, the completed grafting techniques permit the software application to interact with the outside location without modifying the content of the application archive file of the software application. Accordingly, the software application can be permitted to interact with outside locations while being limited in its ability to write data to such outside locations. In this manner, a given software application can be cleanly uninstalled simply by deleting the corresponding application archive file, considering that the software application was never permitted to establish files in other locations outside of the application archive file.

FIG. 1 illustrates an overview 100 of a computing device 101 that can be configured to perform the various techniques described herein, according to some embodiments. The computing device 101 can represent a smartphone, tablet, laptop, desktop, display, watch, media player, or any other suitable computing device. As shown in FIG. 1, the computing device 101 can include a storage device 102, which can represent a hard disk drive, a solid-state drive, a combination of drives, and the like. As also shown in FIG. 1, the computing device 101 can include a memory 150 into which an operating system (OS) 152/application archive files 154 can be loaded and executed by at least one processor (not illustrated in FIG. 1) to perform the various techniques described herein.

According to some embodiments, the storage device 102 can be configured to include a partition table 104 that is used to define the manner in which one or more partitions 106 are established within the storage device 102. Notably, although the drawings and the accompanying descriptions indicate multiple partitions, the embodiments described herein are not so limited. Instead, the storage device 102 can be configured to include a single/global partition that spans all of the physical storage blocks (i.e., contiguous sequences of bytes/bits) in the storage device 102 without departing from the scope of this disclosure.

As shown in FIG. 1, each partition 106 can be configured to include a container 108, which can be configured to include a manager 122, a file system volume table 124, and one or more file system volumes 126. According to some embodiments, the manager 122 represents a combination of logic (e.g., an Application Programming Interface (API)) as well as information for managing various aspects of the operation of the container 108 in which the manager 122 is included. For example, the manager 122 can be utilized (e.g., by the operating system 152—or other entity executing at the computing device 101/connected to the computing device 101) to create, modify, and delete file system volumes 126 within the container 108. Moreover, the manager 122 can be utilized to service input/output (I/O) requests issued by different file system volumes 126 for storage space management, e.g., storage space allocation requests, storage space deletion requests, and the like. Moreover, the manager 122 can be configured to maintain crash protection information as a unified checkpoint log in accordance with the aforementioned I/O requests that the manager 122 is configured to handle. Additionally, the manager 122 can be configured to implement the file system volume table 124 as a way to manage the file system volumes 126 within the container 108. For example, the manager 122 can reference the file system volume table 124 when servicing requests to add, modify, or delete file system volumes 126 within the container 108 to identify how/whether the requests should be properly handled.

Accordingly, the partitions 106/containers 108 can be utilized to implement various file system volumes 126 within the storage device 102 of the computing device 101. According to some embodiments, and as shown in FIG. 1, the operating system 152 can exist within an operating system file system volume 151 that is mounted at the computing device 101, where the operating system file system volume 151 represents an instantiation of a file system volume 126. Additionally, and according to some embodiments, one or more application archive files 154 can exist within an application file system volume 153 that is also mounted at the computing device 101, where the application file system volume 153 represents an instantiation of another file system volume 126. According to some embodiments, the operating system file system volume 151 and the application file system volume 153 are separately mounted in order to establish separate sandboxed environments in which the operating system 152 and the application archive files 154, respectively, can exist and provide functionality to the computing device 101. This approach coincides with the general goal of making the operating system 152 and the application archive files 154 immutable in nature. However, it should be noted that the embodiments set forth herein do not rely on or require separately mounted file system volumes 126. On the contrary, a single file system volume 126 can be mounted to incorporate the operating system 152 and the application archive files 154 without departing from the scope of this disclosure.

According to some embodiments, and as shown in FIG. 1, each application archive file 154 can include a file system data structure 162, file system content 164, and file system security information 166. According to some embodiments, the file system data structure 162 can store information about (1) the file system content 164, and (2) file system security information 166. For example, the file system data structure 162 can include various data structures (e.g., tables, trees, lists, etc.) that define a manner in which the file system content 164—e.g., various files, directories, etc.—are related to one another and hierarchically organized. The file system data structure 162 can also include information pertaining to the storage locations of the various files, directories, etc., within the storage device 102, e.g., physical storage block addresses, offsets, and the like. Additionally, and as described in greater detail herein, the file system security information 166 can define security-related information—e.g., a hash tree, a hash list, a hash chain, etc.—that corresponds to the file system data structure 162 and/or the file system content 164. In particular and, as described in greater detail below in conjunction with FIGS. 2A-2F—the file system security information 166 can include cryptographic information that coincides with the (1) hierarchical structures of the file system data structure 162 and/or file system content 164, as well as (2) the data stored therein. In this manner, the contents of the file system data structure 162 and/or file system content 164 can be independently analyzed and validated against the file system security information 166 to detect changes, if any, that have been made relative to the original state of the application archive file 154. As a result, an increased level of security can be provided by taking defensive measures any time unauthorized changes are detected within a given application archive file 154.

Figure 2A:
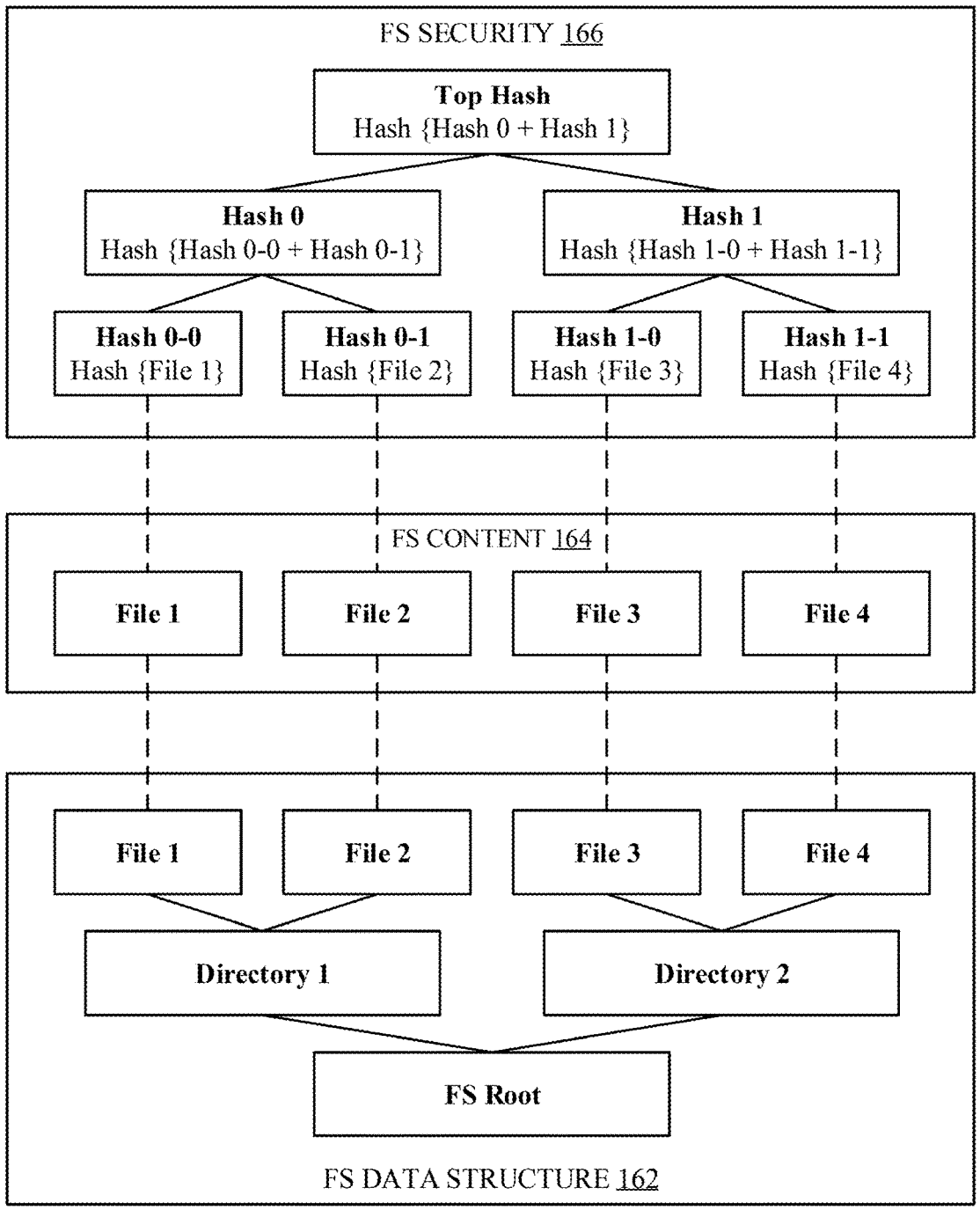
FIGS. 2A-2F illustrate conceptual diagrams of an example scenario for detecting changes to file system content of an application archive file, according to some embodiments.

FIGS. 2A-2F illustrate conceptual diagrams of an example scenario for detecting changes to file system content 164 of an application archive file 154, according to some embodiments. As shown in FIG. 2A, an initial step (0) illustrates example data stored within the application archive file 154. In particular, the file system content 164 consists of four separate and distinct files (File 1, File 2, File 3, and File 4). Additionally, the file system data structure 162 stores hierarchical information that defines the manner in which the four separate and distinct files (File 1, File 2, File 3, and File 4) are hierarchically organized within directories. As shown in FIG. 2A, the hierarchical information stems from a root node that functions as an entry point/root directory and indicates that File 1 and File 2 are stored within a first directory, Directory 1, while File 2 and File 3 are stored within a second directory, Directory 2. It is noted that the file system content 164/file system data structure 162 illustrated in FIG. 2A is merely exemplary and not meant to be limiting, and that any number of files/directories, under any hierarchical organization, can be managed without departing from the scope of this disclosure.

Additionally, and as shown in FIG. 2A, the file system security information 166—which complements the file system content 164—includes data that defines (1) individual hash values (e.g., computed using SHA-2 or other hash functions) that correspond to the files within the file system content 164, as well as (2) organizational information that defines how the individual hash values are hierarchically organized and related to one another.

As a brief aside, it is noted that the file system security information 166 can be generated by a distribution entity that distributes the application archive file 154 to the computing device 101 and that presumably can be trusted by the computing device 101. For example, the distribution entity can receive, from an application developer, an application archive file 154 that includes only the file system data structure 162 and the file system content 164. In turn, the distribution entity can generate the system security information 166 that corresponds to the file system data structure 162 and/or file system content 164 and then incorporate the file system security information 166 into the application archive file 154. Subsequently, the application archive file 154 can be distributed to the computing device 101. At that juncture, the computing device 101—which views the distribution entity as a trusted source—can rely on the file system security information 166 to effectively detect (using the techniques described below) unauthorized changes that are made to the file system data structure 162 and/or file system content 164. It is noted that entities other than distribution entities—e.g., trusted software developers—can generate the file system security information 166 without departing from the scope of this disclosure.

Turning back now to FIG. 2A, the file system security information 166 takes the form of a hash tree, where the leaf nodes—such as Hash 0-0, Hash 0-1, Hash 1-0, and Hash 1-1—represents hashes of data of which File 1, File 2, File 3, and File 4, respectively, are comprised. Nodes further up in the tree—such as Hash 0, Hash 1, and Top Hash—are combined hashes of their respective children. For example, in the file system security information 166 illustrated in FIG. 2A, Hash 0 is the result of hashing the concatenation of Hash 0-0 and Hash 0-1, Hash 1 is the result of hashing the concatenation of Hash 1-0 and Hash 1-1, and Top Hash is the result of hashing the concatenation of Hash 0 and Hash 1. It is noted that although most hash tree implementations are binary—i.e., two child nodes under each node, as depicted in FIG. 2A—they can just as well use any number of child nodes under each node without departing from the scope of this disclosure.

Figure 2B:
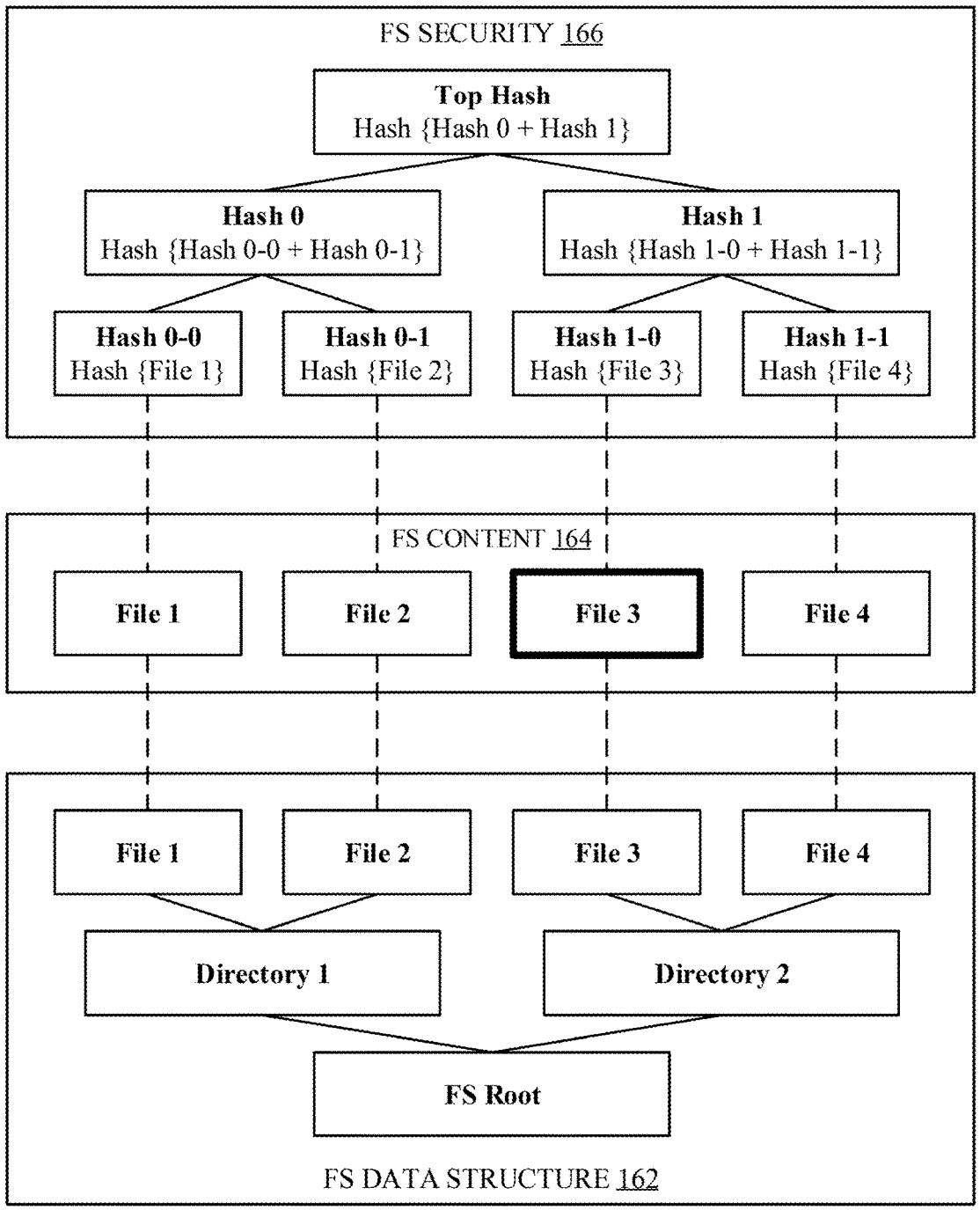

Turning now to FIG. 2B, a first step (1) involves receiving a read request for File 3 of the file system content 164. As shown in FIG. 2B, and as previously described herein, Hash 1-0 within the file system security information 166 corresponds to File 3 of the file system content 164. Accordingly, to effectively determine whether File 3 has been modified—e.g., relative to original state of the application archive file 154 as it was received by the computing device 101— the computing device 101 is tasked with procuring a hash of File 3. However, because Hash 1-0 corresponds to the file that is being validated (i.e., File 3), Hash 1-0 is not obtained from the file system security information 166 itself, but rather is independently generated by the computing device 101 using the same hash function that was used (e.g., by the distribution entity) to generate the nodes within the file system security information 166. In turn, the computing device 101 utilizes the independently generated Hash 1-0 to perform sequential/upward validations of the other nodes within the file system security information 166 to effectively determine whether File 3 has been modified. An example of such validations are described below in conjunction with FIGS. 2C-2F.

Figure 2C:
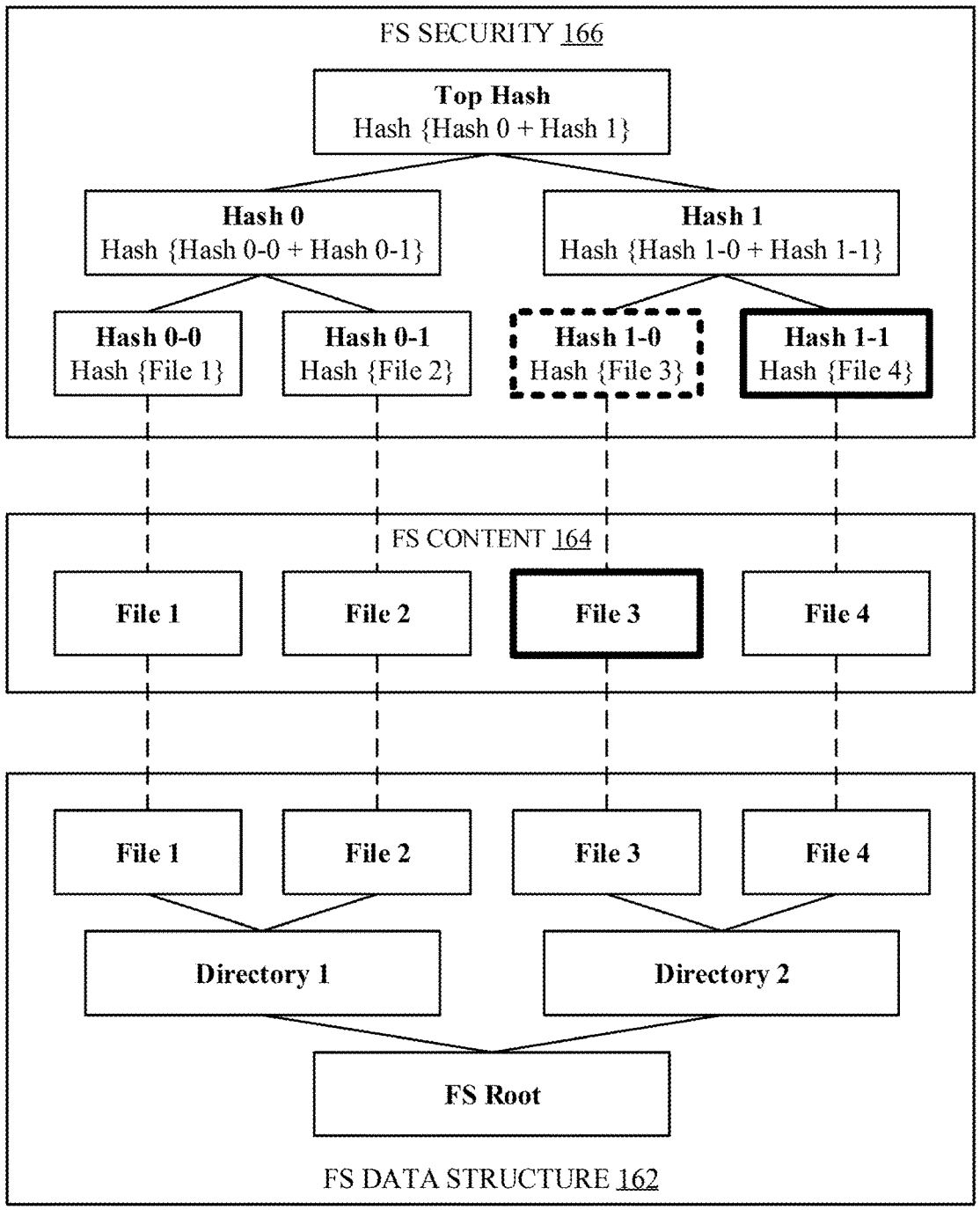
Figure 2D:
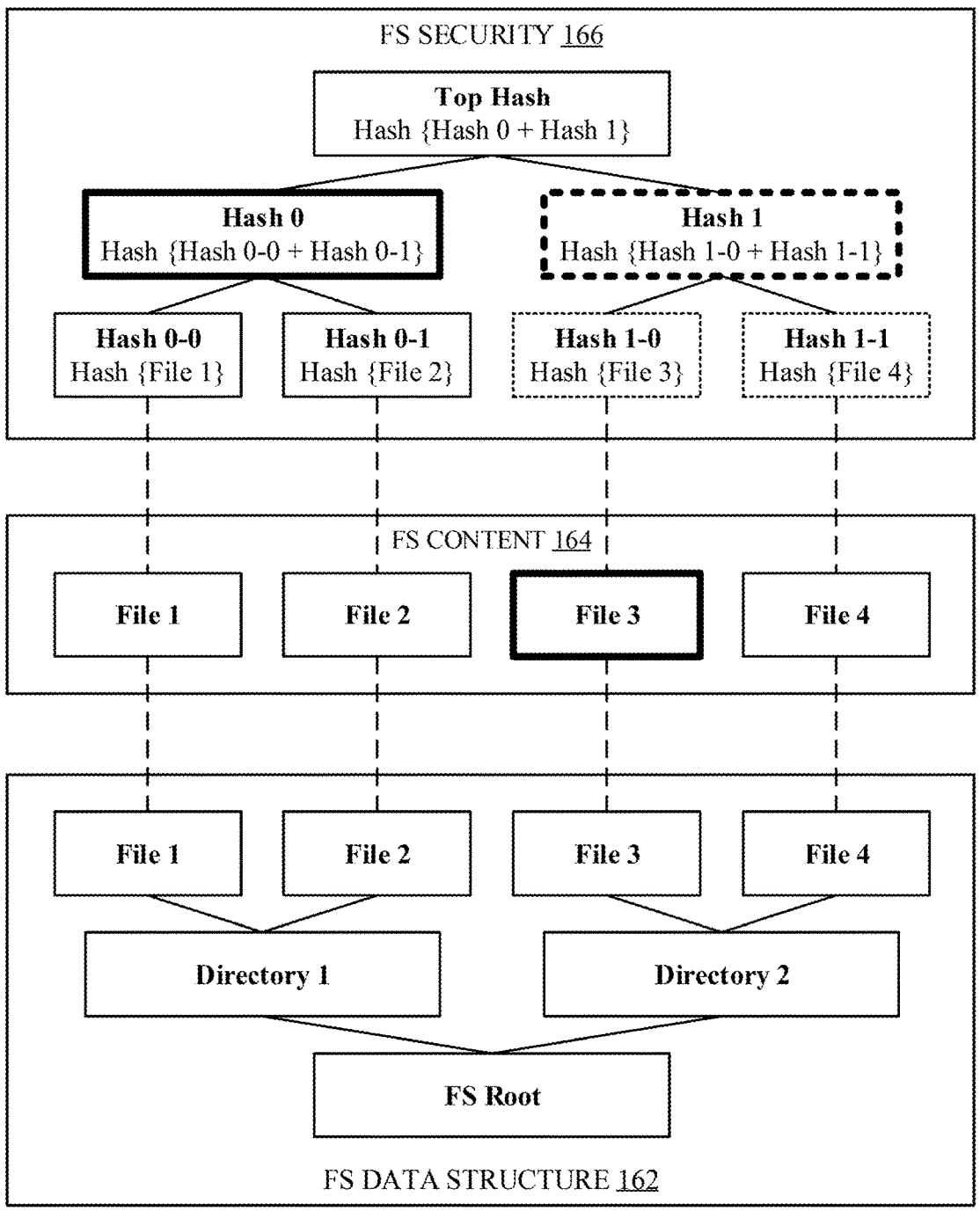
Figure 2E:
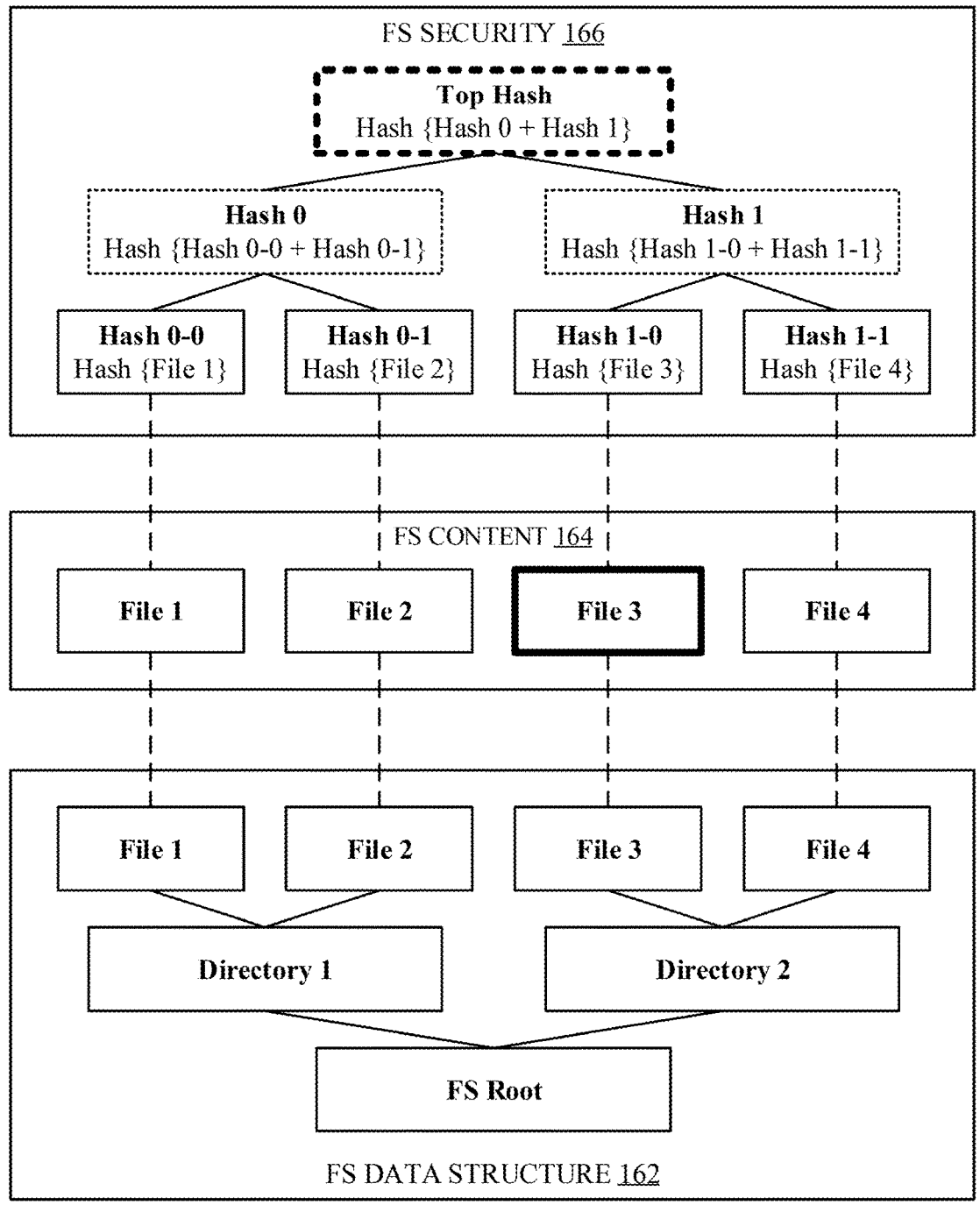
Figure 2F:
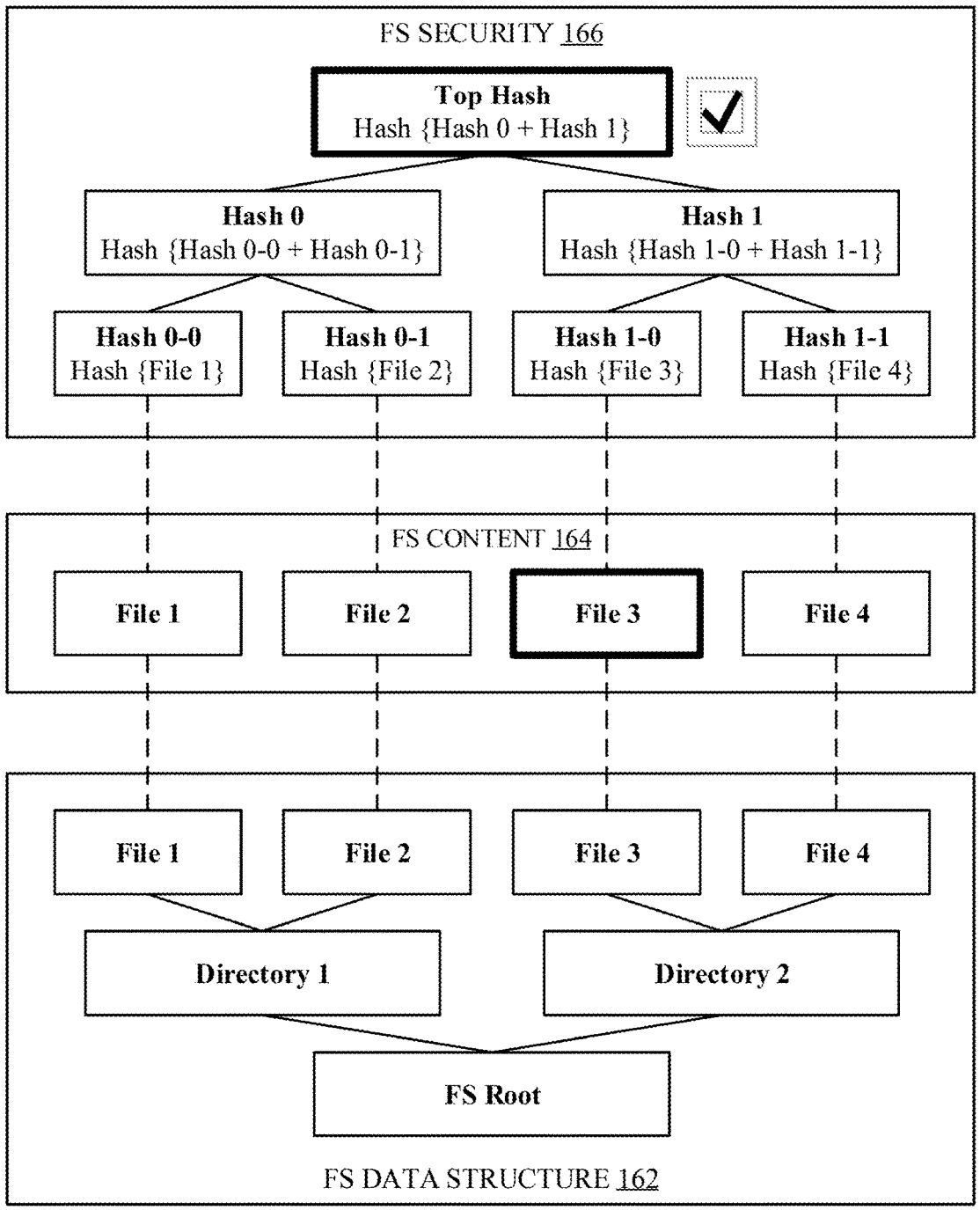

As shown in FIG. 2C, a second step (2) involves the computing device 101 independently generating Hash 1-0 based on File 3. In turn, Hash 1-1 is obtained from the file system security information 166, as it will be needed (along with Hash 1-0) to independently generate Hash 1. As shown in FIG. 2D, a third step (3) involves the computing device 101 independently generating Hash 1 using Hash 1-0 (independently generated by the computing device 101) and Hash 1-1 (obtained from the file system security information 166 itself). Additionally, the computing device 101 obtains Hash 0 from the file system security information 166, as it will be needed (along with Hash 1) by the computing device 101 to independently generate the Top Hash. A fourth step (4) illustrated in FIG. 2E involves the computing device 101 independently generating the Top hash based on Hash 0 (obtained from the file system security information 166) and Hash 1 (independently generated by the computing device 101). In turn, a fifth step (5) illustrated in FIG. 2F involves the computing device 101 verifying that the independently generated Top Hash is equal to the Top Hash included in the file system security information 166.

Accordingly, if an equivalency is found, then the computing device 101 can conclude that File 3 has not been modified, so long as it can be assumed that the file system security information 166 itself has not been correspondingly manipulated. If an equivalency is not found, then the computing device 101 can conclude that File 3 has been modified and take remedial steps to mitigate the situation. This can include, for example, refusing to provide File 3 in response to the read request, issuing a request to a kernel of the computing device 101 to immediately kill the execution of the software application that corresponds to the application archive file 154, issuing a warning to a user of the computing device 101 (or any other person/entity), issuing a warning to a developer of the software application, and so on. It is noted that the foregoing examples are not meant to be limiting, and that any remedial steps can be implemented without departing from the scope of this disclosure.

Accordingly, FIGS. 2A-2F illustrate conceptual diagrams of an example scenario for detecting changes to file system content 164 of an application archive file 154, according to some embodiments. It is noted that although these conceptual diagrams focus on validating file system content 164 using file system security information 166, the application archive file 154 can also include content that enables the file system data structure 162 to be validated. For example, the file system security information 166 can include additional cryptographic content that corresponds to the file system data structure 162 (e.g., as illustrated in FIG. 1), or such additional cryptographic content can be included in additional file system security information within the application archive file 154, without departing from the scope of this disclosure. In this manner, the computing device 101 can be capable of detecting any unauthorized changes that are made to the file system data structure 162 and/or the file system content 164.

Figure 3A:
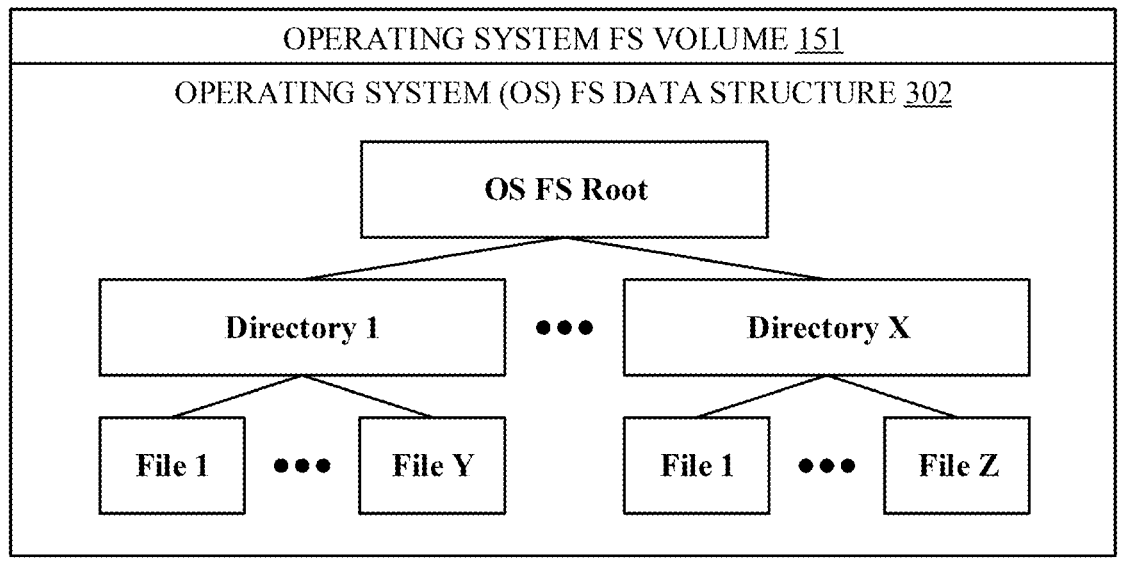
FIGS. 3A-3F illustrate conceptual diagrams of an example scenario for securely executing a software application, according to some embodiments.

FIGS. 3A-3F illustrate conceptual diagrams of an example scenario for securely executing a software application, according to some embodiments. As shown in FIG. 3A, an initial step (0) illustrates an initial state of the computing device 101, where the operating system 152 has been loaded but no software applications are executing. As previously described above in conjunction with FIG. 1, the operating system 152 can exist within the operating system file system volume 151 mounted at the computing device 101. Additionally, and as shown in FIG. 3A, the operating system FS volume 151 can include an operating system FS data structure 302 that stores hierarchical information that defines the manner in which files and directories of which the operating system 152 are organized. As previously described herein, the hierarchical information stems from a root node (illustrated in FIG. 3A as the OS FS Root) that functions as an entry point/root directory and indicates that Files 1-Y are stored within a first directory (Directory 1) while Files 1-Z are stored within a second directory (Directory 2). It is noted that the operating system FS data structure 302 illustrated in FIG. 3A is merely exemplary and not meant to be limiting, and that any number of files/directories, under any hierarchical organization, can be managed without departing from the scope of this disclosure.

Figure 3B:
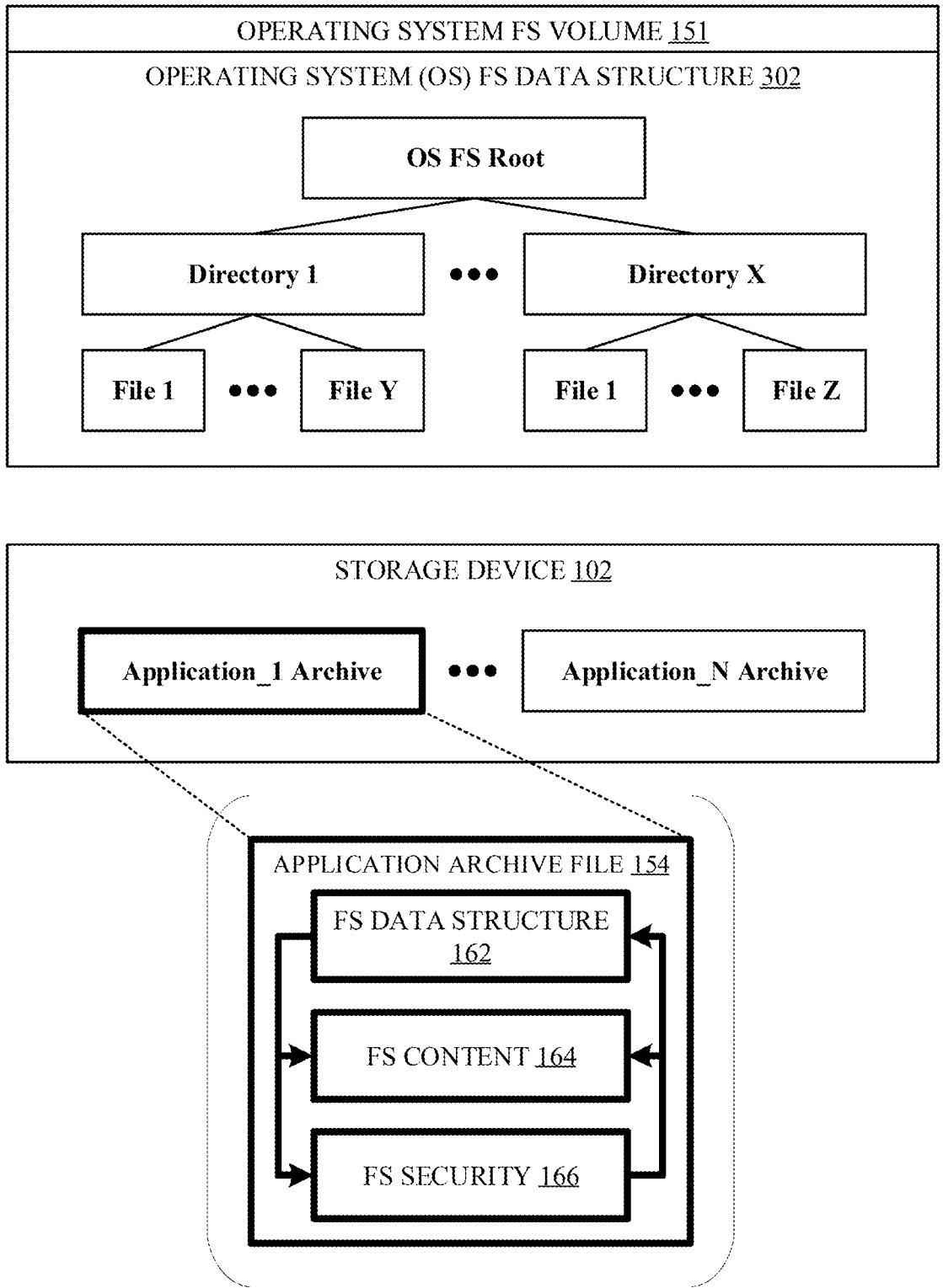

Turning now to FIG. 3B, a first step (1) involves the operating system 152 receiving a request to launch a software application (illustrated in FIG. 3B as Application_1). In one example, the request is generated during a startup procedure of the operating system 152 when loading software applications that are native to the operating system 152. In another example, the request is generated in response to an input to launch Application_1, e.g., stemming from a user selecting an icon, one or more conditions being satisfied, and so on. It is noted that the foregoing examples of how requests can be generated are not meant to be limiting, and that any technique for generating requests can be utilized without departing from the scope of this disclosure.

As shown in FIG. 3B, the operating system 152 can access the storage device 102 to obtain the application archive file 154 that corresponds to Application_1, which is illustrated in FIG. 3B as Application_1 Archive. As described herein, the application archive file 154 can include a file system data structure 162, file system content 164, and file system security information 166. Again, these components collectively enable the operating system 152 to validate the file system data structure 162 and/or the file system content 164 both prior to and during the execution of the software application in an effort to thwart malicious activity.

Figure 3C:
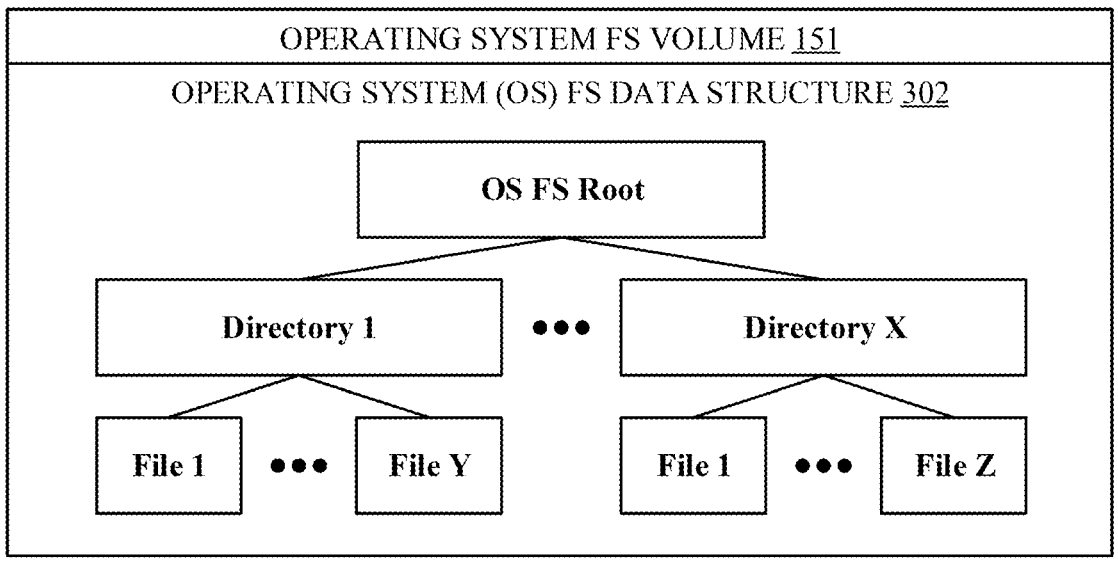
Figure 3C:
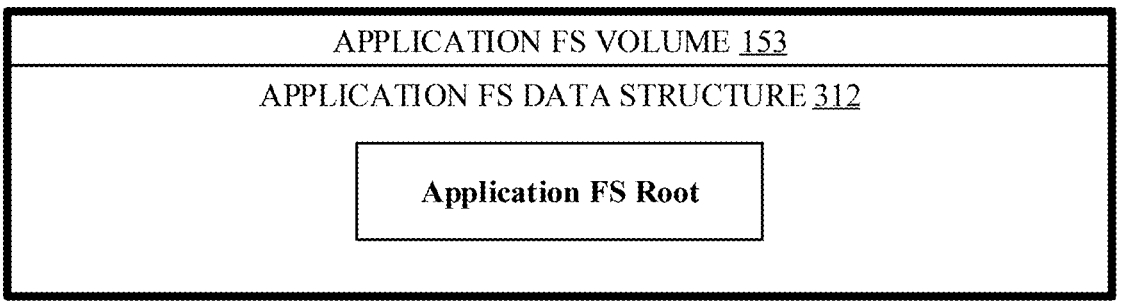
Figure 3C:
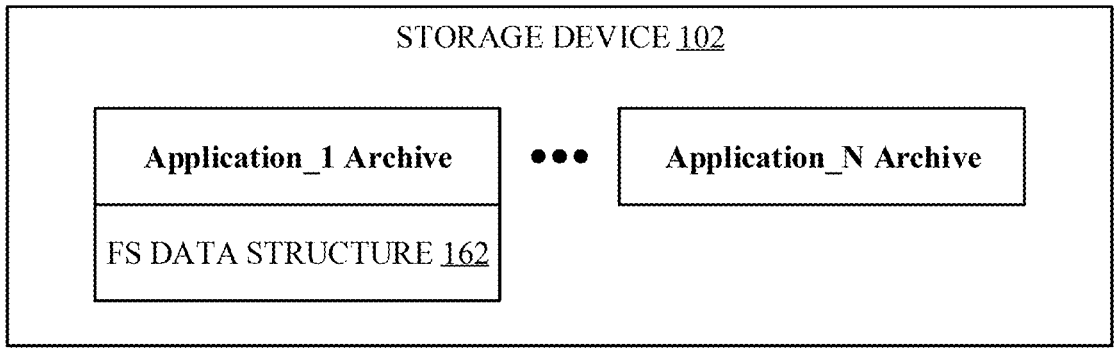

Turning now to FIG. 3C, a second step (2) involves the operating system 152 mounting the application file system volume 153. As described above in conjunction with FIG. 1, the operating system file system volume 151 and the application file system volume 153 can be separately mounted in order to establish separate sandboxed environments in which the operating system 152 and the application archive files 154, respectively, can exist and provide functionality to the computing device 101. This approach coincides with the general goal of making the operating system 152 and the application archive files 154 immutable in nature. However, it should be noted that the embodiments set forth herein do not rely on or require separately mounted file system volumes 126. On the contrary, a single file system volume 126 can be mounted to incorporate the operating system 152 and the application archive files 154 without departing from the scope of this disclosure.

As shown in FIG. 3C, the application file system volume 153 can include an application FS data structure 312. As previously described herein, the FS data structures of volumes/application archive files typically store hierarchical information that defines the manner in which files and directories of the software entities that correspond to the volumes/application archive files are organized. However, under the approach illustrated in FIGS. 3A-3F, the application file system volume 153 is not mounted/utilized for a single software entity—e.g., the operating system 152, a particular application archive file 154, etc.—but rather for multiple application archive files 154 to be accessible under a single mount point. In this regard, the application file system volume 153, when initially mounted, includes only a root node (illustrated in FIG. 3A as the Application FS Root), not a collection of files and directories. In this regard, the root node functions as an entry point/root directory through which application archive files 154 of software applications can be accessed as they are initialized and incorporated into the application file system volume 153/application FS data structure 312, the details of which are described below in conjunction with FIGS. 3D-3F.

Figure 3D:
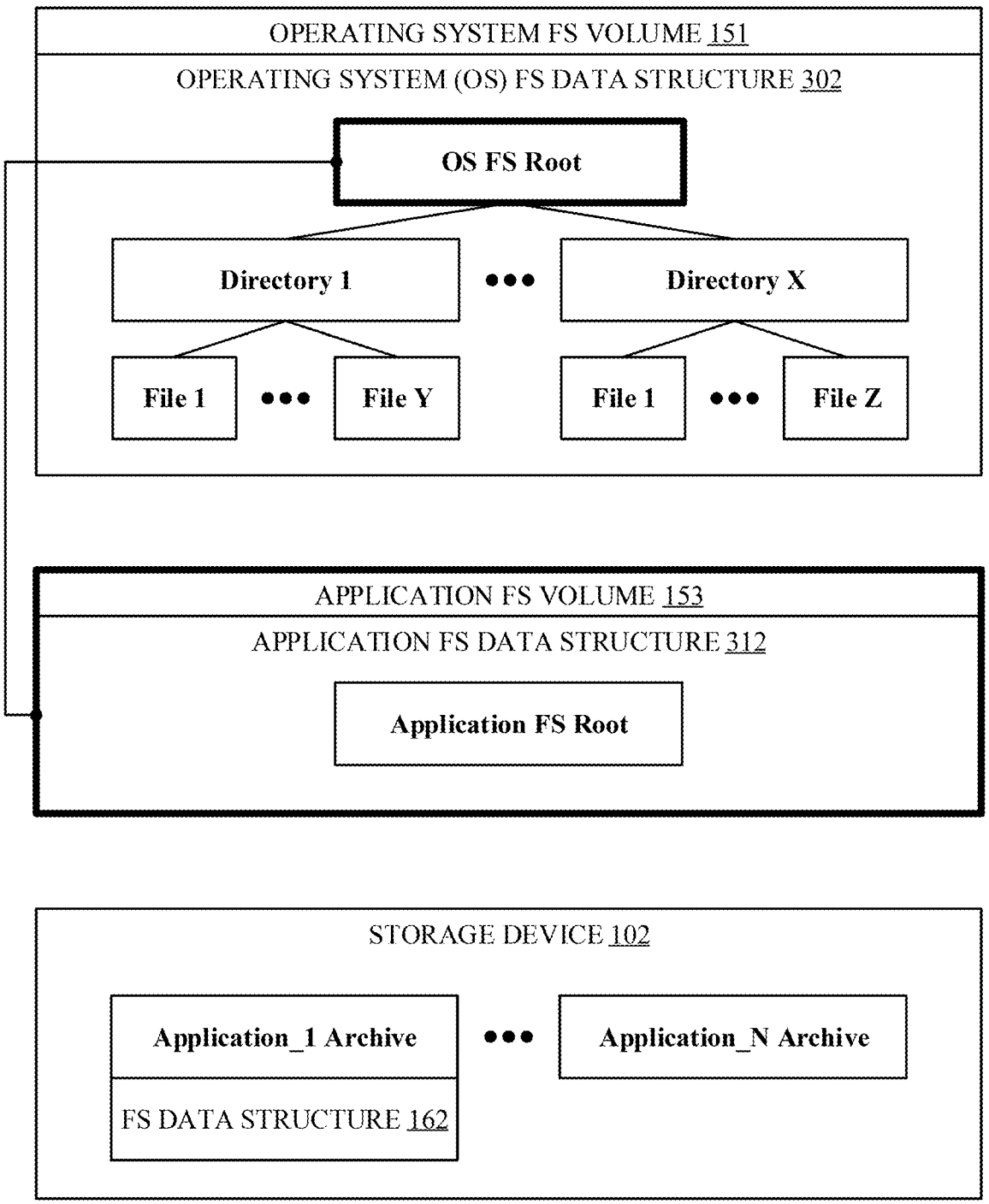

Turning now to FIG. 3D, a third step (3) involves making the application file system volume 153/application FS data structure 312 accessible to the operating system 152. This can involve, for example, updating the OS FS Root to include a reference to the application file system volume 153/application FS data structure 312, updating permissions managed by the operating system 152, and so on. It is noted that the foregoing steps are merely exemplary and not meant to represent an exhaustive list, and that any approach for permitting the operating system 152 to access the separate and distinct mount point associated with the application file system volume 153 can be implemented without departing from the scope of this disclosure.

Figure 3E:
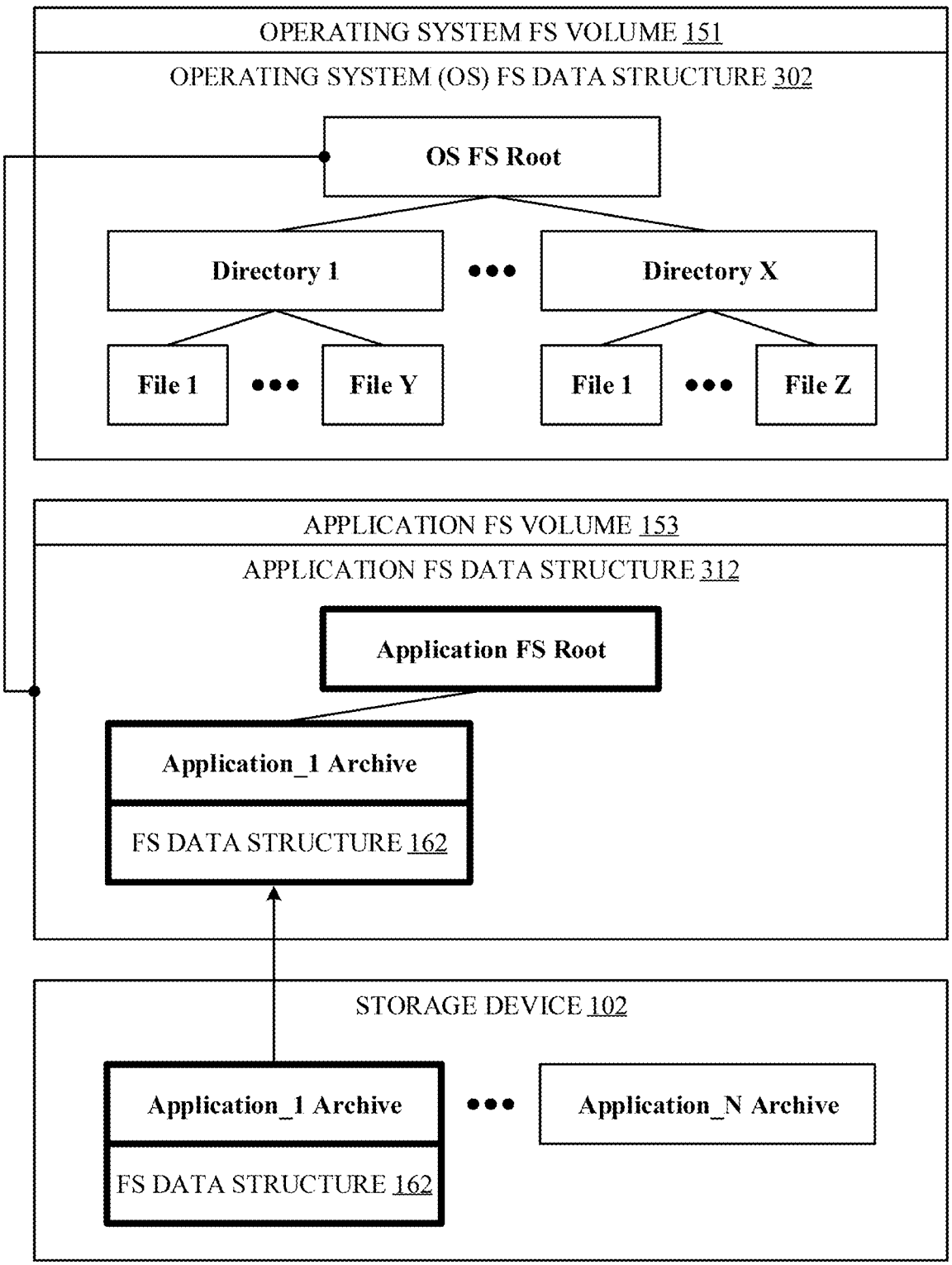

Turning now to FIG. 3E, a fourth step (4) involves the operating system 152 incorporating the application archive file 154 (Application_1 Archive) into the application file system volume 153 to make the application archive file 154 accessible to the operating system 152. According to some embodiments, the incorporation can be achieved by linking the file system data structure 162 of the application archive file 154 (Application_1 Archive) to the Application FS Root within the application FS data structure 312. Such linkage can be established using any approach, including by associating the Application FS Root with a pointer to the file system data structure 162 of the application archive file 154 (Application_1 Archive), updating a configuration of the application FS data structure 312, and the like. This incorporation/association constitutes the grafting technique previously described herein. Through this graft, the application archive file 154 (Application_1 Archive) and its contents become accessible by way of the application file system volume 153/application FS data structure 312. This eliminates the need to establish an individual mount point for the application archive file 154 (Application_1 Archive) (as well other mount points for other software applications to be executed on the computing device 101), which is otherwise time and resource intensive.

At the conclusion of the fourth step (4) illustrated in FIG. 3E, the application archive file 154 (Application_1 Archive) has effectively been grafted into the application FS data structure 312, thereby making the application archive file 154 (Application_1 Archive) (and its contents) accessible by way of the mount point associated with the application file system volume 153. In this regard—and, in accordance with making the application file system volume 153 accessible to the operating system 152 in the third step (3) of FIG. 3D—the operating system 152 now is able to access the application archive file 154 (Application_1 Archive) and its contents. This notion is illustrated in FIG. 3F at a fifth step (5).

Figure 3F:
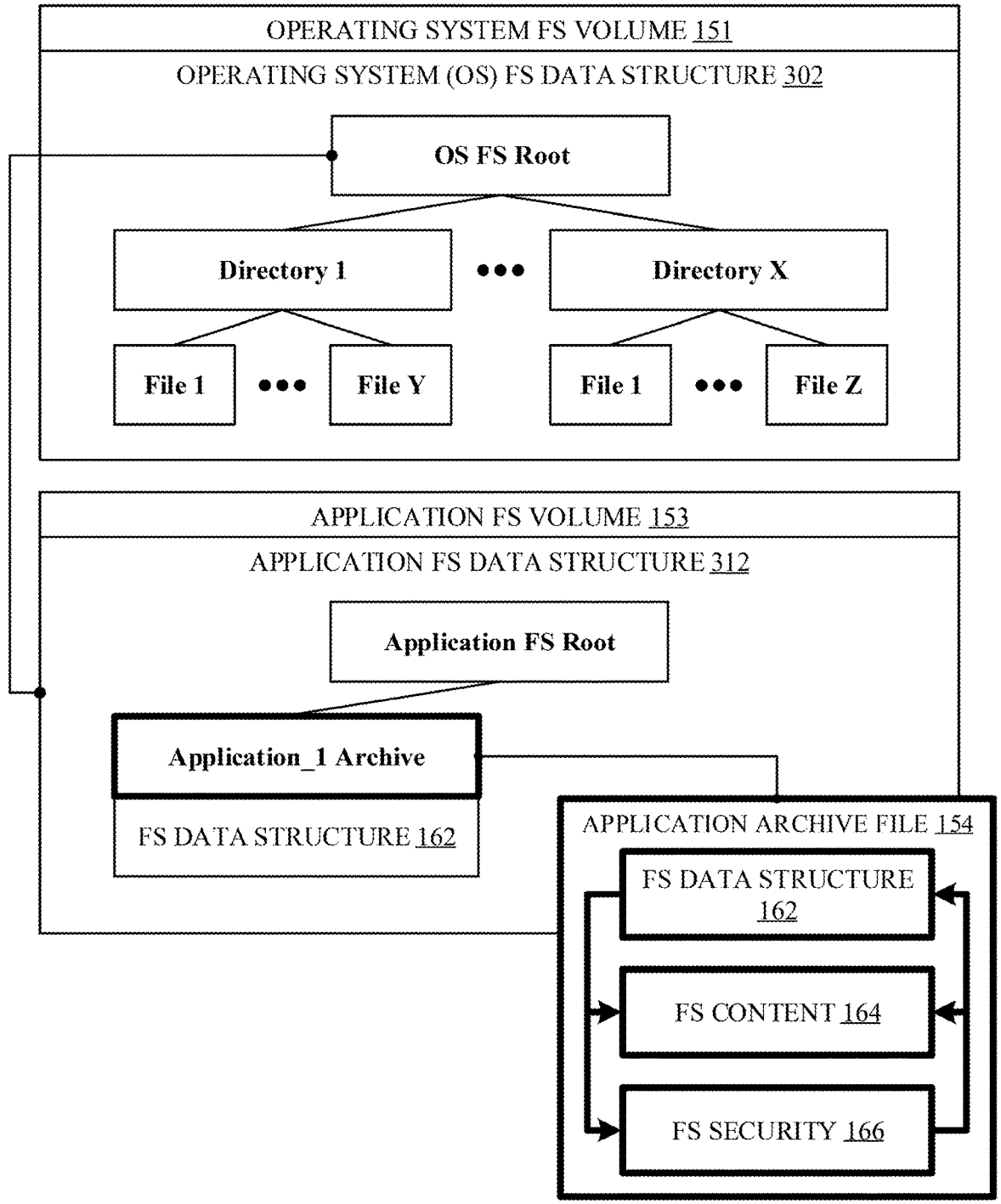

At the conclusion of the fifth step (5) of FIG. 3F, the operating system 152 can take the necessary steps to launch Application_1, which includes loading into memory all files (by way of the file system data structure 162 and file system content 164) that are required to effectively execute the application. Notably, the file system security information 166 of the application archive file 154 (Application_1 Archive) is also accessible to the operating system 152 and can be utilized at any level of granularity to validate the file system data structure 162 and/or file system content 164 as the files are loaded into memory. In this manner, the operating system 152 can efficiently identify when files have been manipulated (e.g., using the techniques described above in conjunction with FIGS. 2A-2F) and take appropriate remedial action.

Figure 4A:
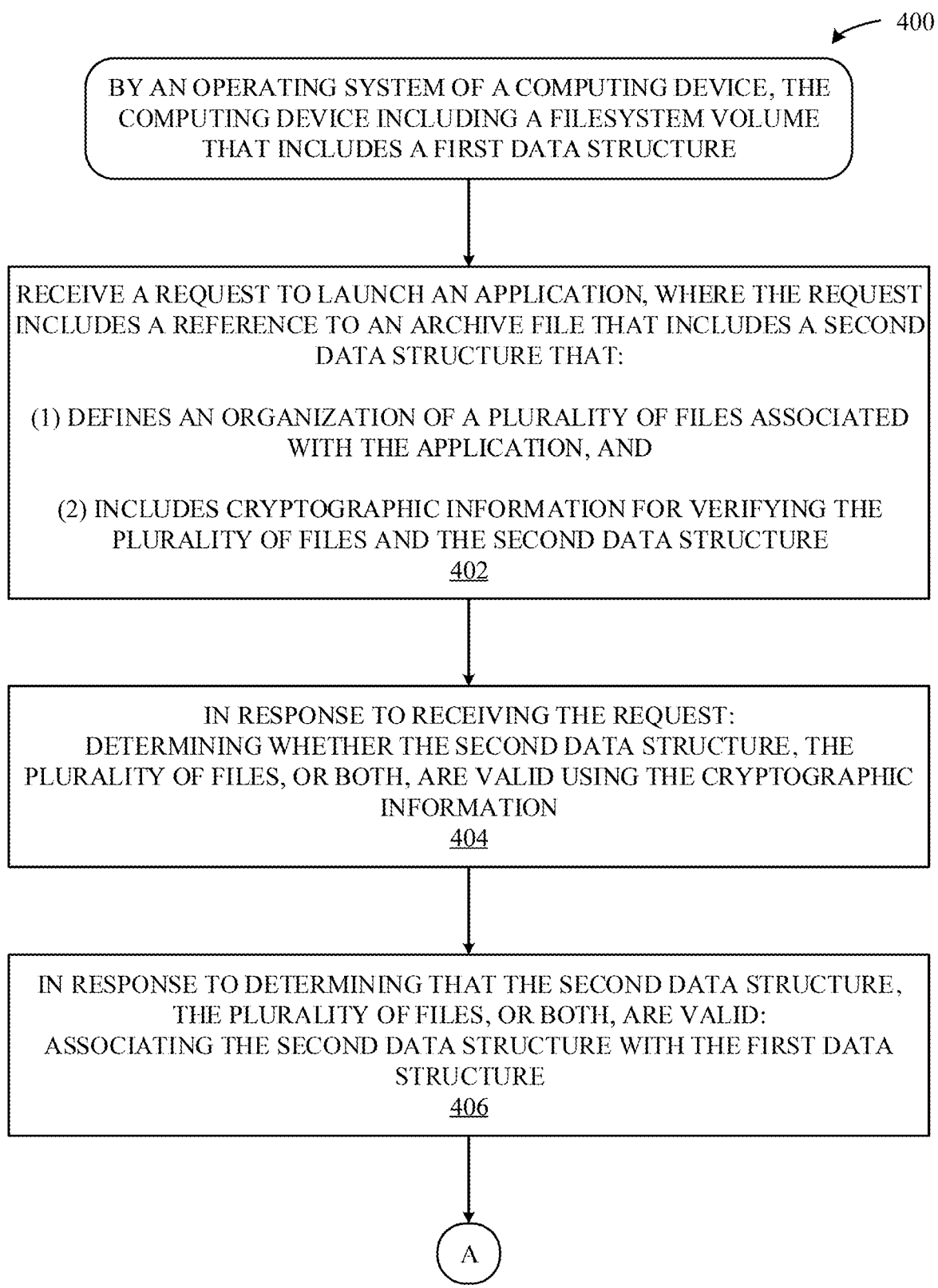
FIGS. 4A-4B illustrate a method for securely executing an application, according to some embodiments.
Figure 4B:
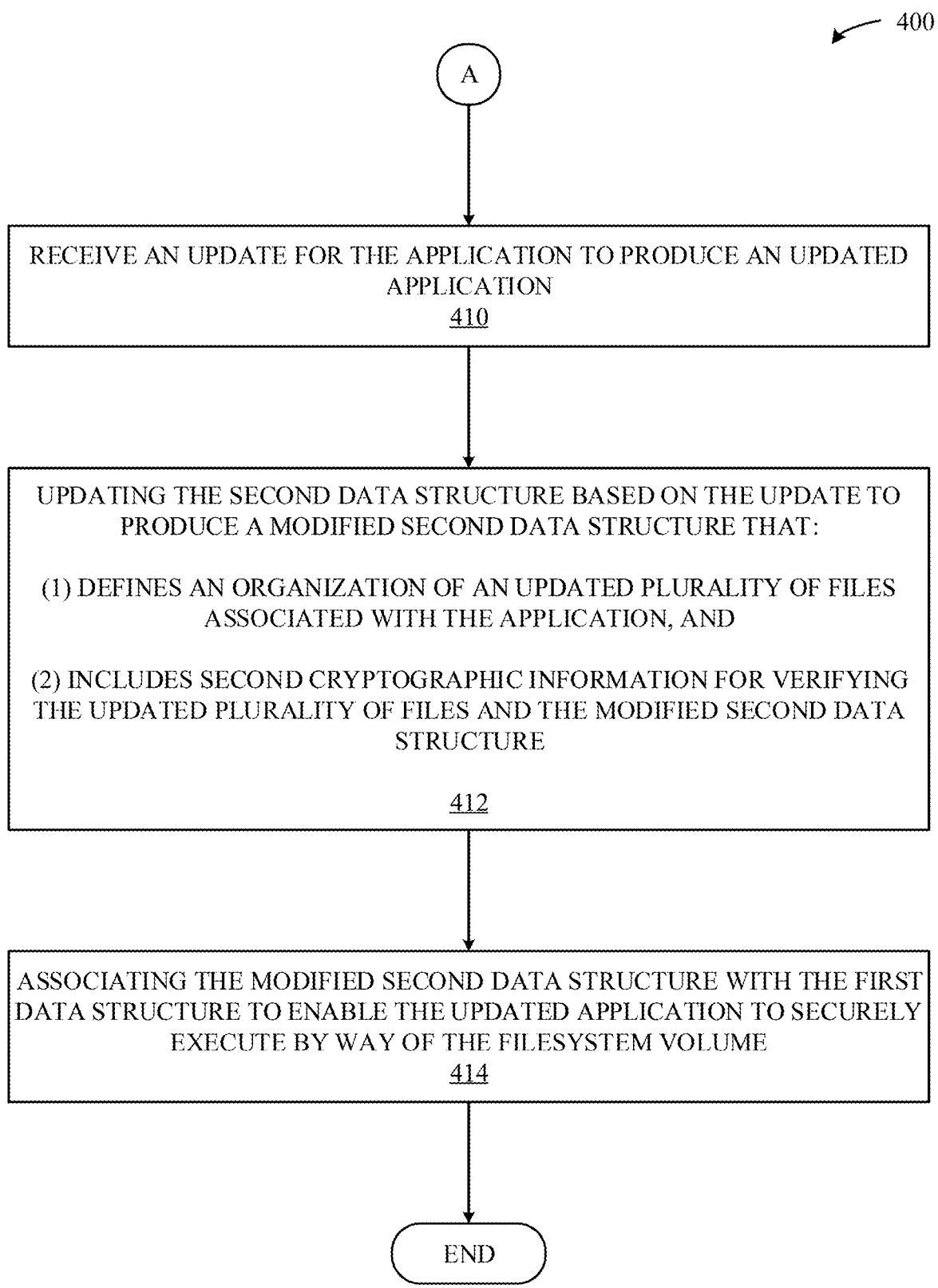

FIGS. 4A-4B illustrate a method 400 for securely executing an application, according to some embodiments. As shown in FIG. 4A, the method 400 begins at step 402, where the operating system 152 receives a request to launch an application (e.g., as described above in conjunction with FIG. 3B). According to some embodiments, the request includes a reference to an archive file that includes a second data structure that: (1) defines an organization of a plurality of files associated with the application, and (2) includes cryptographic information for verifying the plurality of files and the second data structure (e.g., as described above in conjunction with FIG. 3B). At step 404, the operating system 152—in response to receiving the request— determines whether the second data structure, the plurality of files, or both, are valid using the cryptographic information (e.g., as described above in conjunction with FIGS. 2B-2F). At step 406, the operating system 152—in response to determining that the second data structure, the plurality of files, or both, are valid—associates the second data structure with the first data structure (e.g., as described above in conjunction with FIGS. 3C-3F).

Additionally, as show in 4B at steps 410-414 illustrate a continuation of method 400, and set forth a technique for processing an update for the application, according to some embodiments. In particular, at step 410, the operating system 152 receives an update for the application to produce an updated application. At step 412, the operating system 152 updates the second data structure based on the update to produce a modified second data structure that: (1) defines an organization of an updated plurality of files associated with the application, and (2) includes second cryptographic information for verifying the updated plurality of files and the modified second data structure. In turn, at step 414, the operating system 152 associates the modified second data structure with the first data structure to enable the updated application to securely execute by way of the filesystem volume.

Figure 5:
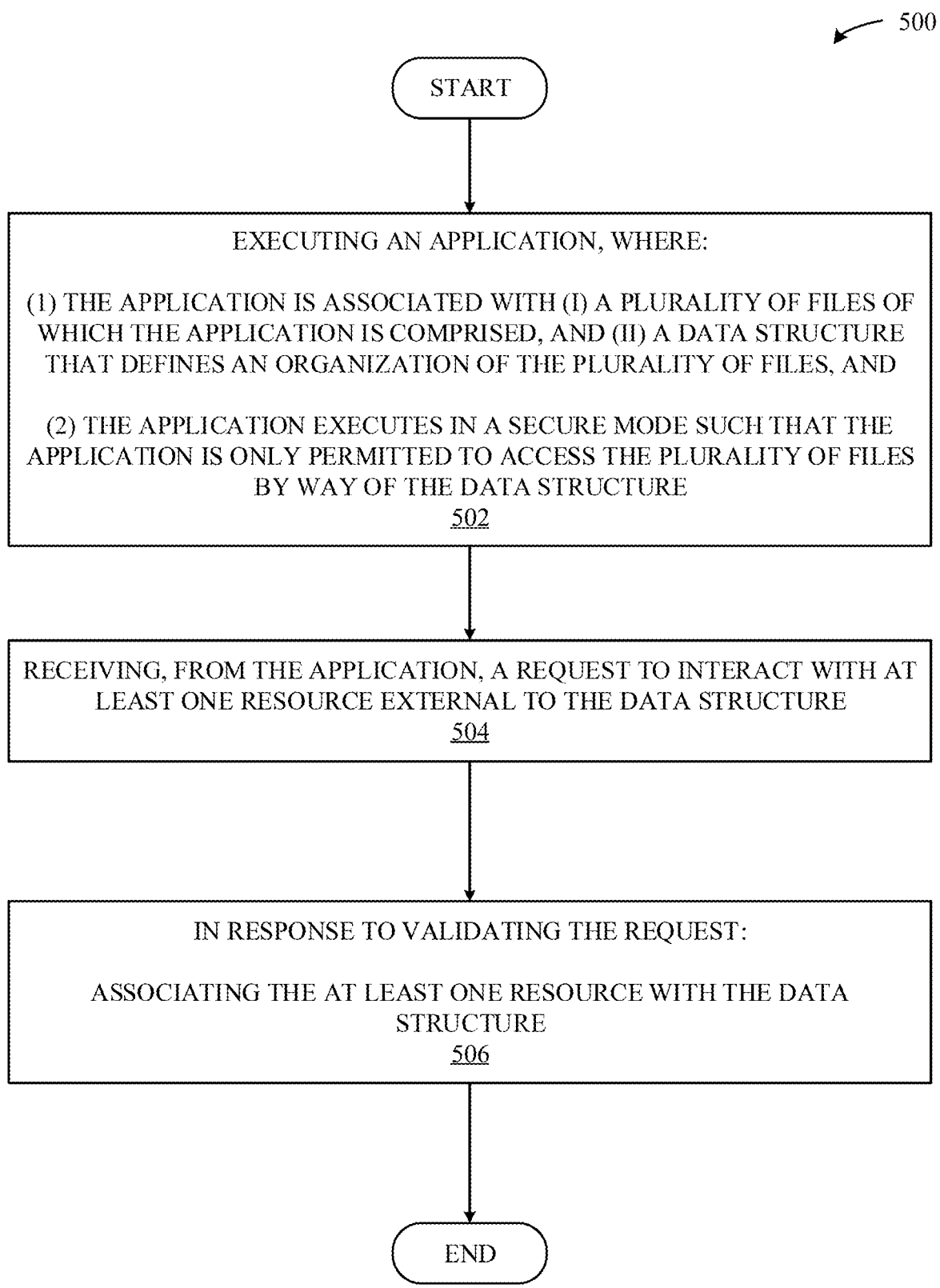
FIG. 5 illustrates a method for managing application executions to facilitate comprehensive uninstallations, according to some embodiments.

FIG. 5 illustrates a method 500 for managing application executions to facilitate comprehensive uninstallations, according to some embodiments. As shown in FIG. 5, the method 500 begins at step 502, where the operating system 152 executes an application, where (1) the application is associated with (i) a plurality of files of which the application is comprised, and (ii) a data structure that defines an organization of the plurality of files, and (2) the application executes in a secure mode such that the application is only permitted to access the plurality of files by way of the data structure. At step 504, the operating system 152 receives, from the application, a request to interact with at least one resource external to the data structure, at step 506, the operating system 152—in response to validating the request—associates the at least one resource with the data structure.

Figure 6:
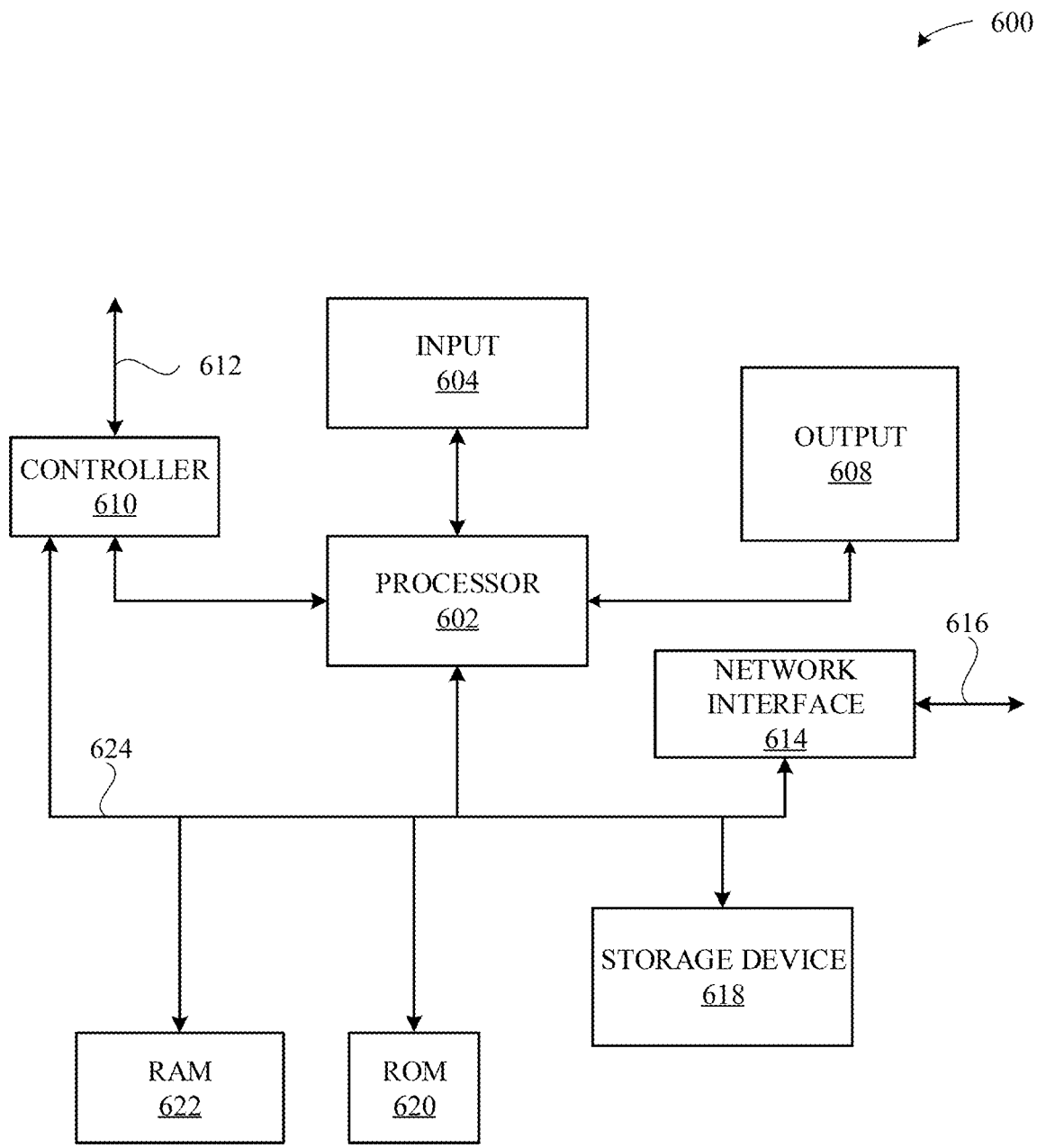
FIG. 6 is a block diagram of a computing device that can represent the components of a computing device or any other suitable device or component for realizing any of the methods, systems, apparatus, and embodiments described herein.

FIG. 6 is a block diagram of a computing device 600 that can represent the components of the computing device 101 (of FIG. 1) or any other suitable device or component for realizing any of the methods, systems, apparatus, and embodiments described herein. It will be appreciated that the components, devices, or elements illustrated in and described with respect to FIG. 6 may not be mandatory and thus some may be omitted in certain embodiments. As shown in FIG. 6, the computing device 600 can include a processor 602 that represents a microprocessor, a coprocessor, circuitry and/or a controller for controlling the overall operation of computing device 600. Although illustrated as a single processor, it can be appreciated that the processor 602 can include a plurality of processors. The plurality of processors can be in operative communication with each other and can be collectively configured to perform one or more functionalities of the computing device 600 as described herein. In some embodiments, the processor 602 can be configured to execute instructions that can be stored at the computing device 600 and/or that can be otherwise accessible to the processor 602. As such, whether configured by hardware or by a combination of hardware and software, the processor 602 can be capable of performing operations and actions in accordance with embodiments described herein.

The computing device 600 can also include user input device 604 that allows a user of the computing device 600 to interact with the computing device 600. For example, user input device 604 can take a variety of forms, such as a button, keypad, dial, touch screen, audio input interface, visual/image capture input interface, input in the form of sensor data, etc. Still further, the computing device 600 can include an output 608 that can be controlled by processor 602. The output 608 can include a display device, audio device, haptic feedback device, or any other output device suitable for providing output to a user of a device. Controller 610 can be used to interface with and control different equipment through equipment control bus 612. The computing device 600 can also include a network/bus interface 614 that couples to data link 616. Data link 616 can allow the computing device 600 to couple to a host computer or to accessory devices. The data link 616 can be provided over a wired connection or a wireless connection. In the case of a wireless connection, network/bus interface 614 can include a wireless transceiver.

The computing device 600 can also include a storage device 618, which can have a single disk or a plurality of disks (e.g., hard drives) and a storage management module that manages one or more partitions within the storage device 618. In some embodiments, the storage device 618 can include flash memory, semiconductor (solid state) memory or the like. Still further, the computing device 600 can include Read-Only Memory (ROM) 620 and Random-Access Memory (RAM) 622. The ROM 620 can store programs, code, instructions, utilities, or processes to be executed in a non-volatile manner. The RAM 622 can provide volatile data storage, and store instructions related to components of the storage management module that are configured to carry out the various techniques described herein. The computing device 600 can further include data bus 624. Data bus 624 can facilitate data and signal transfer between at least processor 602, controller 610, network/bus interface 614, storage device 618, ROM 620, and RAM 622.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data, which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for securely executing an application, the method comprising:
   by an operating system of a computing device, the computing device including a filesystem volume that includes a first data structure:
      receiving a request to launch the application, wherein the request references an application archive file that includes a second data structure that:
         defines an organization of a plurality of files associated with the application, and
         includes cryptographic information for verifying the plurality of files and the second data structure;
      in response to receiving the request:
         determining whether the second data structure, the plurality of files, or both, are valid using the cryptographic information; and
      in response to determining that the second data structure, the plurality of files, or both, are valid:
         associating the second data structure with the first data structure.

2. The method of claim 1, wherein the first data structure:
   defines an organization of a second plurality of files associated with the filesystem volume including the operating system, and
   includes second cryptographic information for verifying the second plurality of files and the first data structure.

3. The method of claim 2, wherein enabling the application to securely execute by way of the filesystem volume comprises:
   receiving, from the application, a second request to access at least one file of the plurality of files;
   referencing the second data structure to access the at least one file from the plurality of files; and
   utilizing the cryptographic information to validate the at least one file.

4. The method of claim 3, wherein the cryptographic information comprises a hash tree that includes a plurality of nodes, and utilizing the hash tree to validate the at least one file comprises:
   identifying, among the plurality of nodes, at least one node that corresponds to the at least one file;
   generating a hash of the at least one file; and
   comparing the hash to at least one hash included in the at least one node.

5. The method of claim 4, further comprising, in response to determining that the hash does not match the at least one hash included in the at least one node:
   returning an error that causes the application to terminate.

6. The method of claim 1, wherein:
   the first data structure comprises a first filesystem for the filesystem volume,
   the second data structure comprises a second filesystem for the application, and
   associating the second data structure with the first data structure causes the second filesystem to be accessible only by way of the first filesystem.

7. The method of claim 1, further comprising, in response to receiving an update for the application to produce an updated application:
- updating the second data structure based on the update to produce a modified second data structure that:
  - defines an organization of an updated plurality of files associated with the application, and
  - includes second cryptographic information for verifying the updated plurality of files and the modified second data structure; and
- associating the modified second data structure with the first data structure to enable the updated application to securely execute by way of the filesystem volume.

8. The method of claim 7, further comprising, prior to updating the second data structure:
- in response to determining that the application is executing:
  - terminating the application; and
  - disassociating the second data structure with the first data structure.

9. A non-transitory computer readable storage medium configured to store instructions that, when executed by a processor included in a computing device, cause the computing device to securely execute an application, by carrying out steps that include:
- by an operating system of the computing device, the computing device including a filesystem volume that includes a first data structure:
  - receiving a request to launch the application, wherein the request references an application archive file that includes a second data structure that:
    - defines an organization of a plurality of files associated with the application, and
    - includes cryptographic information for verifying the plurality of files and the second data structure;
  - in response to receiving the request:
    - determining whether the second data structure, the plurality of files, or both, are valid using the cryptographic information; and
    - in response to determining that the second data structure, the plurality of files, or both, are valid:
      - associating the second data structure with the first data structure.

10. The non-transitory computer readable storage medium of claim 9, wherein the first data structure:
- defines an organization of a second plurality of files associated with the filesystem volume including the operating system, and
- includes second cryptographic information for verifying the second plurality of files and the first data structure.

11. The non-transitory computer readable storage medium of claim 10, wherein enabling the application to securely execute by way of the filesystem volume comprises:
- receiving, from the application, a second request to access at least one file of the plurality of files;
- referencing the second data structure to access the at least one file from the plurality of files; and
- utilizing the cryptographic information to validate the at least one file.

12. The non-transitory computer readable storage medium of claim 11, wherein the cryptographic information comprises a hash tree that includes a plurality of nodes, and utilizing the hash tree to validate the at least one file comprises:
- identifying, among the plurality of nodes, at least one node that corresponds to the at least one file;
- generating a hash of the at least one file; and
- comparing the hash to at least one hash included in the at least one node.

13. The non-transitory computer readable storage medium of claim 12, wherein the steps further include, in response to determining that the hash does not match the at least one hash included in the at least one node:
- returning an error that causes the application to terminate.

14. The non-transitory computer readable storage medium of claim 9, wherein:
- the first data structure comprises a first filesystem for the filesystem volume,
- the second data structure comprises a second filesystem for the application, and
- associating the second data structure with the first data structure causes the second filesystem to be accessible only by way of the first filesystem.

15. The non-transitory computer readable storage medium of claim 9, wherein the steps further include, in response to receiving an update for the application to produce an updated application:
- updating the second data structure based on the update to produce a modified second data structure that:
  - defines an organization of an updated plurality of files associated with the application, and
  - includes second cryptographic information for verifying the updated plurality of files and the modified second data structure; and
- associating the modified second data structure with the first data structure to enable the updated application to securely execute by way of the filesystem volume.

16. The non-transitory computer readable storage medium of claim 15, wherein the steps further include, prior to updating the second data structure:
- in response to determining that the application is executing:
  - terminating the application; and
  - disassociating the second data structure with the first data structure.

17. A computing device configured to securely execute an application, the computing device comprising a processor configured to cause the computing device to carry out steps that include:
- by an operating system of the computing device, the computing device including a filesystem volume that includes a first data structure:
  - receiving a request to launch the application, wherein the request references an application archive file that includes a second data structure that:
    - defines an organization of a plurality of files associated with the application, and
    - includes cryptographic information for verifying the plurality of files and the second data structure;
  - in response to receiving the request:
    - determining whether the second data structure, the plurality of files, or both, are valid using the cryptographic information; and
    - in response to determining that the second data structure, the plurality of files, or both, are valid:
      - associating the second data structure with the first data structure.

18. The computing device of claim 17, wherein the first data structure:
- defines an organization of a second plurality of files associated with the filesystem volume including the operating system, and
- includes second cryptographic information for verifying the second plurality of files and the first data structure.

19. The computing device of claim 18, wherein enabling the application to securely execute by way of the filesystem volume comprises:
- receiving, from the application, a second request to access at least one file of the plurality of files;
- referencing the second data structure to access the at least one file from the plurality of files; and
- utilizing the cryptographic information to validate the at least one file.

20. The computing device of claim 19, wherein:
- the cryptographic information comprises a hash tree that includes a plurality of nodes, and utilizing the hash tree to validate the at least one file comprises:
    - identifying, among the plurality of nodes, at least one node that corresponds to the at least one file,
    - generating a hash of the at least one file, and
    - comparing the hash to at least one hash included in the at least one node; and
- the steps further include, in response to determining that the hash does not match the at least one hash included in the at least one node:
    - returning an error that causes the application to terminate.

\* \* \* \* \*